United States Patent
Wolff

Patent Number: 5,655,072
Date of Patent: Aug. 5, 1997

[54] METHOD AND APPARATUS FOR TESTING A SYTEM COMPONENT WITH TEST CHECKPOINTING

[75] Inventor: Robert M. Wolff, Fremont, Calif.

[73] Assignee: Samsung Information Systems America, San Jose, Calif.

[21] Appl. No.: 631,523

[22] Filed: Apr. 12, 1996

[51] Int. Cl.[6] .................................... G06F 11/00
[52] U.S. Cl. ................... 395/183.01; 395/183.06; 395/701; 364/267; 364/262.4; 364/DIG. 1
[58] Field of Search ............... 395/183.01, 183.06, 395/183.2, 700; 364/DIG. 1, DIG. 2, 267, 265, 262.4; 371/3, 46, 69.1, 183.12, 183.07, 183.22

[56] References Cited

U.S. PATENT DOCUMENTS

| | | | |
|---|---|---|---|
| 4,740,969 | 4/1988 | Fremont | 371/12 |
| 4,817,092 | 3/1989 | Denny | 371/11 |
| 4,873,687 | 10/1989 | Brew | 371/8.2 |
| 4,881,230 | 11/1989 | Clark et al. | 371/20.1 |
| 5,155,844 | 10/1992 | Cheng et al. | 395/575 |
| 5,237,690 | 8/1993 | Bealkowski et al. | 395/700 |
| 5,319,773 | 6/1994 | Britton et al. | 395/575 |
| 5,325,368 | 6/1994 | James et al. | 371/22.3 |
| 5,325,519 | 6/1994 | Long et al. | 395/575 |
| 5,357,519 | 10/1994 | Martin et al. | 371/15.1 |
| 5,421,003 | 5/1995 | Escola et al. | 395/575 |
| 5,495,590 | 2/1996 | Comfort et al. | 395/375 |
| 5,551,043 | 8/1996 | Crump et al. | 395/750 |

*Primary Examiner*—Robert W. Beausoliel, Jr.
*Assistant Examiner*—Dieu-Minh Le

[57] ABSTRACT

An apparatus and method for testing the installation and functioning of a component of computer system has a test engine which causes the identity of a test to be performed to be stored in a nonvolatile memory before being performed. The test is announced to the installer and then ran. This procedure is performed for a sequence of tests. In the event of a crash during testing, the step-by-step sequencing of the tests and the storage of the test identifies step-by-step in the nonvolatile memory simplifies identification of the test that caused the crash for the installer.

21 Claims, 3 Drawing Sheets

000
METHOD AND APPARATUS FOR TESTING A SYTEM COMPONENT WITH TEST CHECKPOINTING

FIELD OF THE INVENTION

The present invention relates to the field of testing of system components, and more particularly, to the initial testing of a component that has been installed within a system, such as a computer system.

DESCRIPTION OF RELATED ART

One of the significant advantages of the personal computer concept is the ease with which systems may be configured and customized. For example, in order to add enhanced sound and video capabilities to a personal computer (PC) based system, a user may add a sound and video card to the PC system. However, whenever a card is installed in a PC system, there is a risk that the card will not work, for one reason or another. For example, the hardware may be malfunctioning as a result of a static charge, or there may be an interrupt conflict or I/O address conflict. In many instances, it is difficult for the installer of the card to determine the cause of the card not working.

One of the reasons that it is difficult to determine the cause of a problem is that the design of the drivers from the operating system level assume perfectly operating and configured hardware. When a problem is present, there is nothing in place that handles the error conditions. Furthermore, error condition traps and code for overcoming the errors usually are designed for when the system is actually running, and not for installation. The error condition during running is detected and dealt with in some appropriate manner. However, in the initial set-up of a card, the software designer essentially assumes that the card will operate correctly. If not, the instructions for installation of the card generally refers the installer to contact technical support.

The more complex a card is, the greater the likelihood of problems occurring. For example, a PC card that is a video card and sound card, an example of a multi-device card, has more opportunity to malfunction. Another complication with a multi-device card is that it may be used in conjunction with another card in the same PC system that provides similar functionality. For example, if a sound and video card is installed in a system in which a sound blaster card has already been installed, there is a strong potential for problems, such as interrupt conflicts.

One of the limitations with known test machines (or "engines") is the minimal amount of feedback provided to the user regarding the testing procedure. Generally, a test machine will inform a user, who instructs the test machine to perform a specific function, only that the test machine performed the function. Another limitation of the prior art testing machines is that when the test is to be run on a piece of hardware, especially hardware on a PC, there is a risk of the system crashing. Such a crash may be caused by interrupt conflicts, for example. Due to the system crashing, the reason for the crash may be lost because of the crash itself.

SUMMARY OF THE INVENTION

There is a need for a method and apparatus to test the installation and functioning of a component of a system, such as a card of a computer system, in a manner that provides information to the installer should the component not operate properly.

This and other needs are met by the present invention which provides a method of testing a component of a computer system having a nonvolatile memory. The method comprises the steps of: (a) informing a user of a test to be performed on the component; (b) storing information identifying the test and the nonvolatile memory; and (c) performing the test on the component. If the test was successfully completed, steps (a)–(c) are repeated for another test until all of the tests for the component are successfully completed. If any test is not successfully completed, the information identifying that test is retrieved from the nonvolatile memory and the user is informed of the identity of that test.

Since the present invention provides a method by which the information identifying a test is stored in a nonvolatile memory and the user is informed of the test to be performed on the component, once the test is performed, the user will be able to determine the cause of the system crash in the event of such a crash. When a crash occurs, the nonvolatile memory will still contain the information identifying the test which caused the crash stored within memory. After retrieving this information, the installer can then work to resolve the problem, in many instances, without resorting to technical support. This "checkpointing", in which the tests are separately identified to the user prior to being run on the system component, and stored in the nonvolatile memory prior to being run, is advantageous for the user and installer of the system component.

In another embodiment of the present invention, a computer readable medium is provided having stored thereon instructions which, when executed by a processor, causes the processor to perform the steps of informing a user of a test to be performed on a component coupled to a computer system, storing information identifying the test and nonvolatile memory of the system, and controlling performing of the test on the component. These steps are repeated if the test was successfully completed for another test, until all tests for the component are successfully completed. If any test is not successfully completed, the information identifying that test from the nonvolatile memory is retrieved and the user is informed of the identity of that test.

In another aspect of the present invention, a computer system is provided with a central processing unit, and a nonvolatile memory coupled to the central processing unit. A card is coupled to the central processing unit. A test engine is used by the central processing unit to inform a user of a test to be performed on the card, store information identifying the test in the nonvolatile memory and perform the test on the card. If the test was successfully completed, the test engine causes the central processing unit to repeat these steps for another test until all tests for the component are successfully completed. If any test is not successfully completed, the test engine causes the central processing unit to retrieve the information identifying that test from the nonvolatile memory and inform the user of the identity of that test.

The foregoing and other features, aspects and advantages of the present invention will become more apparent from the following detailed description of the present invention when taken in conjunction with the accompanying drawings.

DETAILED DESCRIPTION OF ILLUSTRATIVE EMBODIMENTS

Figure 1:
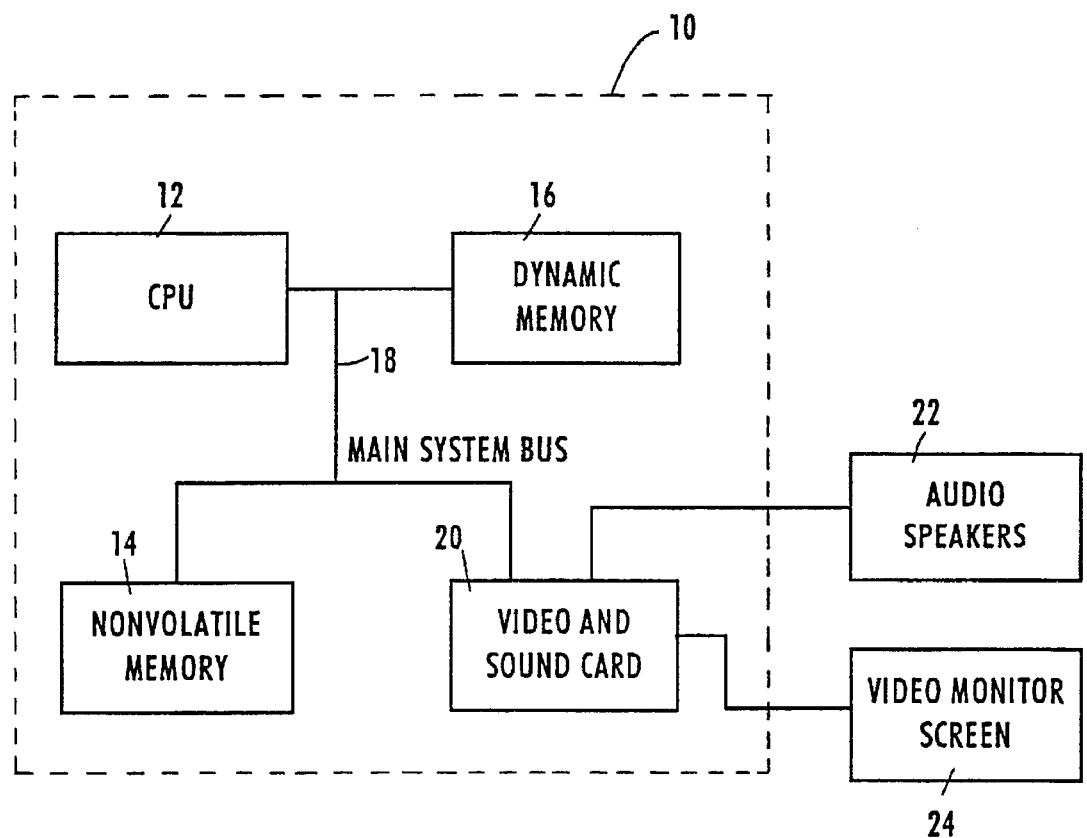
FIG. 1 is a block diagram of a personal computer system constructed in accordance with an exemplary embodiment of the present invention.

FIG. 1 is a block diagram of a personal computer (PC) system constructed in accordance with an embodiment of the present invention. Although the invention is being described for use in a PC system, the present invention finds utility in other types of computer systems and digital data systems.

The PC system 10 includes a central processing unit 12 and a nonvolatile memory 14. Examples of nonvolatile memories include a hard disk drive, and an electrically erasable programmable read only memory (EEPROM). A typical PC system will also have a dynamic memory, such as DRAM 16. The components of the PC system 10 are coupled together by a main system bus, such as a PCI bus 18.

A system component, such as card 20, may also be coupled to the PC system 10 through the main system bus 18. The card 20 will provide enhanced capabilities to the PC system 10, and can be, for example, a video card that provides enhanced 3-dimensional graphics and 3-dimensional sound. The output of the card 20 is coupled to audio speakers 22 and a video monitor screen 24. The video card 20 is exemplary only, as other types of cards are usable with the test engine to be described below.

In the example of the sound and video card 20 depicted in FIG. 1, the PC system 10 may also have another sound card (not illustrated) which may cause complications due to the presence of two sound cards in the same PC system 10. These complications can include interrupt conflicts that will cause the system to crash or work improperly. Other potential problems include I/O address conflicts, and hardware-type problems. It is therefore desirable to a user that installs the card 20 into the PC system 10 for the system to inform the user of any installation problems. The installer of the card 20 therefore is provided with a test engine for the card, in accordance with the present invention, that informs the user of the step-by-step testing procedures, and also stores the identification of these tests in a step-by-step manner in nonvolatile memory. The test engine may be provided on a floppy disk or a CD-ROM, for example. Alternatively, the test engine may be provided directly on the card itself, in a memory. Since the identity of the tests are stored in a step-by-step manner, if the system crashes during a test, the user/installer will be aware of which test caused the crash of the system by the test engine inquiring (post-mortem) of the nonvolatile memory.

Figure 2:
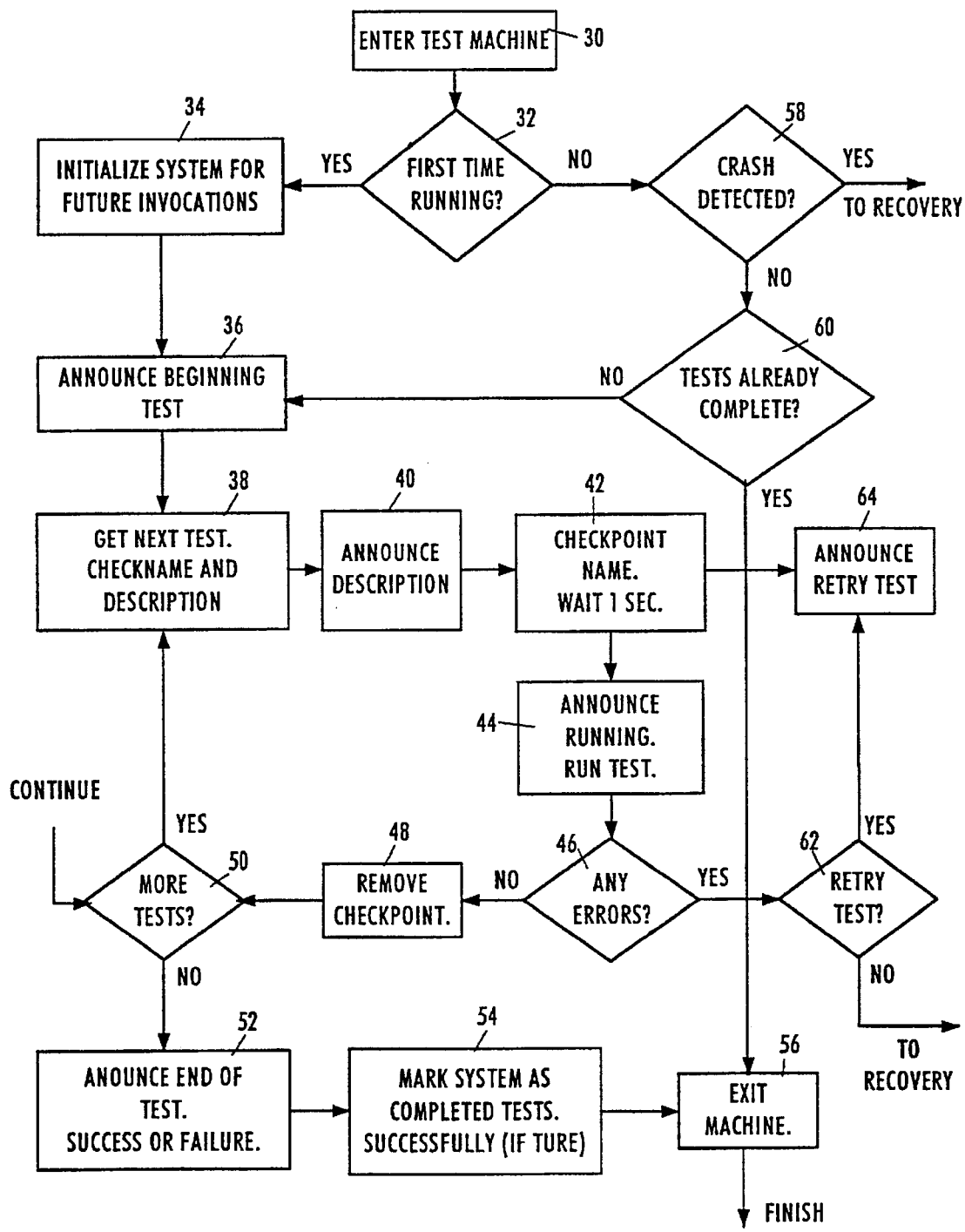
FIG. 2 is a flowchart of a test engine in accordance with an embodiment of the present invention.

FIG. 2 is a flowchart of a test engine in accordance with an embodiment of the present invention. In this example, the test engine resides in a storage medium, for example, a CD-ROM, and is read into the nonvolatile memory 14. Alternatively, the test engine may reside in the card 20 that is being installed. After physical installation of the card 20, the test engine is run by the central processing unit 12. The test machine (engine) is entered at step 30, as shown in FIG. 2. It is then decided in step 32 whether it is the fist time that the test engine has been run. If it is the first time running, the system is initialized for future invocations in step 34. On the video monitor 24, the beginning of the tests is announced (step 36) by the CPU through the test engine. The next test (in this case the first test) is retrieved from the test engine in step 38. With this test, the "checkname" and description of the test are also retrieved by the CPU 12. The checkname is the name of the test.

In step 40, the description of the test is announced to the installer, either over the speakers 22 or on the monitor 24. In step 42, the checkname is "checkpointed", by storing the checkname in the nonvolatile memory 14. There is a delay of one second, in certain embodiments, which provides the installer with some time to prepare for the running of the test.

In step 44, the running of the test is announced by the CPU 12. The test is then run. In step 46, it is determined whether any errors occurred during the test. If there were no errors, the checkpoint, including the checkname, is removed from the nonvolatile memory in step 48. It is then determined in step 50 whether any more tests need to be run in the sequence of tests needed for the particular system component or card 20. If more tests are needed, the test loop comprising steps 38, 40, 42, 44, 46, 48 and 50 are repeated for the sequence of tests.

If there are no more tests in the sequence, the end of the testing is announced by the CPU 12, in step 52. The success or failure of the testing is also announced at this point. The system is then marked as completed tests successfully in step 54 and the test machine is exited in step 56.

In the test loop, in step 46 which determines whether there are any errors in the test, if an error is detected it is then determined whether to re-try the test in step 62. If the test is to be re-tried, an announcement is made in step 64 that the test will be re-tried. In order to re-try the test, the checkname is checkpointed again in step 42 and the test is run in step 44. If the test is not to be re-tried, the recovery engine (FIG. 3) will then be entered.

Figure 3:
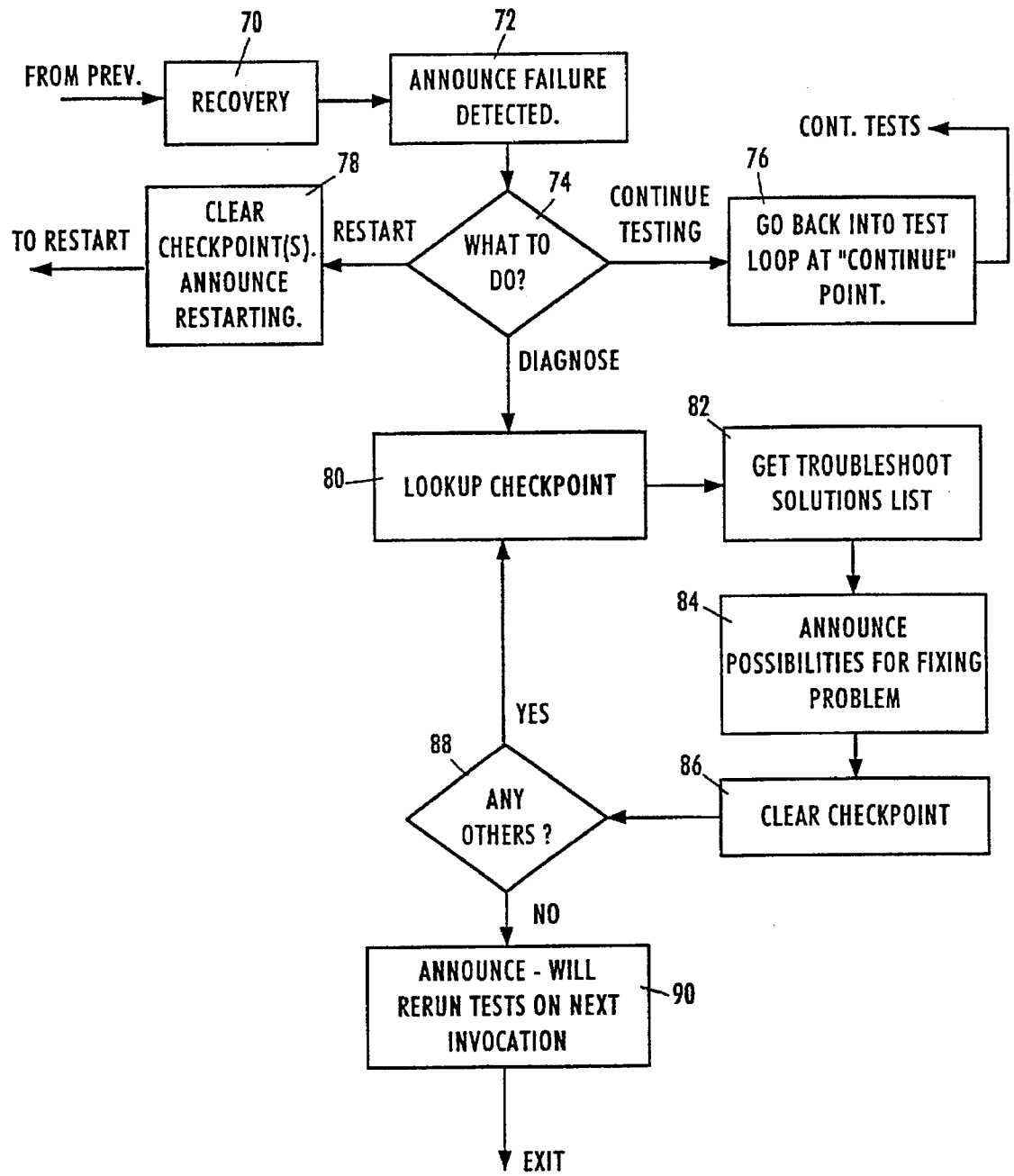
FIG. 3 is a flowchart of a recovery engine in accordance with an embodiment of the present invention.

Referring back to step 32, if it is not the first time running for this test machine, it is determined in step 58 whether a crash has been detected. If yes, the recovery engine in FIG. 3 is then entered. If no crash has been detected, it is then determined in step 60 whether the tests are already complete. If yes, the test engine is exited in step 56 and the testing is finished. If the tests are not already complete, the test engine continues with step 36 in which the beginning of the test is announced to the installer, and the test engine proceeds as described above.

The test engine described in FIG. 2 provides a checkpointing of the testing process for installation of a card or component of a system. This sequential, step-by-step performance of a sequence of tests, in which the tests are announced to the installer and stored in a nonvolatile memory before being performed, permits ready diagnosis in the event the system crashed during one of the tests. In certain embodiments of the invention, the information that is checkpointed and stored in the nonvolatile memory includes solution information which identifies to the user (installer) possible solutions to causes for that test not completing. Checkpointed information also, in certain embodiments, includes description information that describes the test to the installer. For example, if the card 20 is a video and sound card, the announcement of the test may describe the test as "sound will be played for one second". The test is checkpointed and the installer can then listen for the sound. If there is a sound, the installer knows that the test has passed. The next test may be, for example, "two sound clips will be played, the first sound clip being no 3-dimensional sound, second sound clip being the same as the first sound clip but with 3-dimensional sound enabled". The installer will then listen for the two sound clips and determine whether the 3-dimensional sound feature of the card 20 is operating correctly based upon the two sound clips being played. The testing procedure in this example then continues with further testing.

FIG. 3 is a flowchart of a recovery engine in accordance with an embodiment of the present invention. As with the test engine of FIG. 2, the recovery engine reside in storage media, such as a magnetic disk or CD-ROM, and is read into non-volatile memory prior to installation and testing of the card 20. Alternatively, the recovery engine may reside on the card 20 in certain embodiments.

The recovery engine is entered in response to the test engine detecting a crash (step 58 of FIG. 2) or after an error has been determined in a test and the test is not to be re-tried (step 62). The recovery engine is entered in step 70, and in step 72, the detection of a failure is announced to the installer either through the speakers 22 or the video monitor 24.

After the announcement of the failure to the installer, a decision is made in step 74 as to whether to restart the testing procedure, continue testing, or perform diagnosis. If it is decided to continue testing, in step 76 the test loop is entered at the continue point so that the next test in the sequence of tests after the failing test is performed. The sequence of tests proceeds starting with the test immediately following the failing test in the sequence of tests.

If it is decided in step 74 to restart the testing, the checkpoint for the failing test is cleared and the testing procedure is restarted. This is announced in step 78 to the user and the test engine is entered at step 30 of FIG. 2 so that the entire test sequence is performed again. However, in this instance, in step 32 it is determined that it is not the first time running for this test engine. Since a crash has not been detected in this restarting of the test engine, the procedure continues with step 60 in which it is determined whether the tests are already complete. Since the tests are not already complete, for this restart of tests, the beginning of the tests announced in step 36 in the procedure continues as described earlier for FIG. 2.

The third option at the decision step 74 after a failure has been detected and announced is to diagnose the failure. In step 80, the checkpoint is looked up in the nonvolatile memory 14 and the possible solutions list for that the failing test is retrieved in step 82 from the storage medium on which the recovery engine is stored, such as a floppy disk or CD-ROM. The possible solutions list enables the installer to perform troubleshooting for the failing test of that checkpoint. Alternatively, the recovery engine may have already been read into the nonvolatile memory from the storage medium, and the possible solutions are read from the non-volatile memory 14 in that instance. After retrieval, the possible solutions for fixing the problem which caused the failure of the test are announced to the installer in step 84. The checkpoint is then cleared in step 86. It is then determined in step 88 whether there are any other failing tests. If so, the checkpoint for these failing tests are looked up in step 80 and the diagnosis continues with steps 82–86 as described above. If there are no other tests which failed, an announcement is made to the installer that the tests will be re-run upon the next invocation of the test engine, for example, upon rebooting.

The test engine and recovery engine of the present invention provide an installer of a system component with feedback necessary to troubleshoot a card or the installation of the card, whether or not the system has crashed. This eases the installation burden of the installer and reduces reliance on technical support.

Although the present invention has been described and illustrated in detail, it is clearly understood that the same is by way of illustration and example only and is not to be taken by way of limitation, the spirit and scope of the present invention being limited only by the terms of the appended claims.

I claim:

1. A method of testing a component of a computer system, the computer system having a nonvolatile memory, comprising the steps of:
   a) informing a user of a test to be performed on the component;
   b) storing information identifying the test in the nonvolatile memory;
   c) performing the test on the component;
   d) if the test was successfully completed, repeating steps a–c for another test until all tests for the component are successfully completed; and
   e) if any test is not successfully completed, retrieving the information identifying that test from the nonvolatile memory and informing the user of the identity of that test.

2. The method of claim 1, wherein the information identifying the test includes solution information identifying to the user possible solutions to causes for any test not completing when that test does not successfully complete.

3. The method of claim 2, wherein the information identifying the test further includes description information that describes the test to a user.

4. The method of claim 1, wherein the tests are performed in a sequence of tests, the method further comprising continuing the sequence of tests following the test that did not successfully complete after the step of informing the user of the identity of that test that did not successfully complete.

5. The method of claim 2, wherein the tests are performed in a sequence of tests, the method further comprising the steps of halting the sequence of tests after a test is not successfully completed, clearing the information identifying that test from the nonvolatile memory, and restarting the sequence of tests from a first one of the tests in the sequence.

6. The method of claim 2, wherein the tests are performed in a sequence of tests, the method further comprising the steps of halting the sequence of tests after a test is not successfully completed, clearing the information identifying that test from the nonvolatile memory, and restarting the sequence of tests starting from the test that did not successfully complete.

7. A computer-readable medium having stored thereon instructions which, when executed by a processor, cause said processor to perform the steps of:
   a) informing a user of a test to be performed on a component coupled to a computer system;
   b) storing information identifying the test in a nonvolatile memory of the computer system;
   c) controlling performing of the test on the component;
   d) if the test was successfully completed, repeating steps a–c for another test until all tests for the component are successfully completed; and
   e) if any test is not successfully completed, retrieving the information identifying that test from the nonvolatile memory and informing the user of the identity of that test.

8. The medium of claim 7, wherein the information identifying the test includes solution information identifying to the user possible solutions to causes for any test not completing when that test does not successfully complete.

9. The medium of claim 8, wherein the information identifying the test further includes description information that describes the test to a user.

10. The medium of claim 7, wherein the tests are performed in a sequence of tests, the medium further having instructions which cause said processor to continue the sequence of tests following the any test did not successfully complete after the step of informing the user of the identity of that test that did not successfully complete.

11. The medium of claim 8, wherein the tests are performed in a sequence of tests, the medium further having instructions which cause said processor to halt the sequence of tests after a test is not successfully completed, clear the information identifying that test from the nonvolatile memory, and restart the sequence of tests from a first one of the tests in the sequence.

12. The medium of claim 8, wherein the tests are performed in a sequence of tests, the medium further having instructions which cause said processor to halt the sequence of tests after a test is not successfully completed, clear the information identifying that test from the nonvolatile memory, and restart the sequence of tests starting from the test that did not successfully complete.

13. A computer system comprising:

a central processing unit;

a nonvolatile memory coupled to the central processing unit;

a video board coupled to the central processing unit; and a test engine used by the central processing unit to a) inform a user of a test to be performed on the video board, b) store information identifying the test in the nonvolatile memory, c) perform the test on the video board, if the test was successfully completed, repeating a)–c) for another test until all tests for the component are successfully completed, and if any test is not successfully completed, retrieve the information identifying that test from the nonvolatile memory and informing the user of the identity of that test.

14. The computer system of claim 13, further comprising a video monitor coupled to the video board, the video monitor displaying the information identifying the test.

15. The computer system of claim 13, wherein the nonvolatile memory is a memory storage disk.

16. The computer system of claim 13, wherein the nonvolatile memory is an erasable programmable read only memory.

17. The computer system of claim 13, wherein the test engine includes means for providing solution information to the user which identifies possible solutions to causes for that test not completing when that test does not successfully complete.

18. The computer system of claim 13, wherein the test engine includes means for describing the test that will be performed to a user.

19. The computer system of claim 13, wherein the test engine includes means for causing the tests to be performed by the central processing unit in a sequence of tests, the test engine having instructions which cause said processor to continue the sequence of tests following the test that did not successfully complete after the step of informing the user of the identity of that test that did not successfully complete.

20. The computer system of claim 13, wherein the test engine includes means for causing the tests to be performed by the central processing unit in a sequence of tests, the test engine having instructions which cause said processor to halt the sequence of tests after a test is not successfully completed, clear the information identifying that test from the nonvolatile memory, and restart the sequence of tests from a first one of the tests in the sequence.

21. The computer system of claim 13, wherein the test engine includes means for causing the tests to be performed by the central processing unit in a sequence of tests, the test engine having instructions which cause said processor to halt the sequence of tests after a test is not successfully completed, clear the information identifying that test from the nonvolatile memory, and restart the sequence of tests starting from the test that did not successfully complete.

* * * * *